Dec. 15, 1942.    S. MANIYA    2,305,301
FOCUSING DEVICE FOR PORTABLE PHOTOGRAPHIC CAMERA
Filed June 5, 1940    2 Sheets-Sheet 1

INVENTOR:
S. Mamiya
BY:
Gascoup Downing & Seebel
ATTORNEYS.

Dec. 15, 1942. S. MANIYA 2,305,301
FOCUSING DEVICE FOR PORTABLE PHOTOGRAPHIC CAMERA
Filed June 5, 1940 2 Sheets-Sheet 2
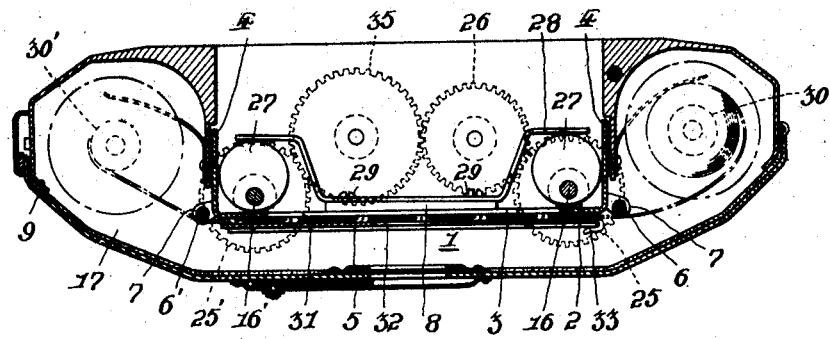
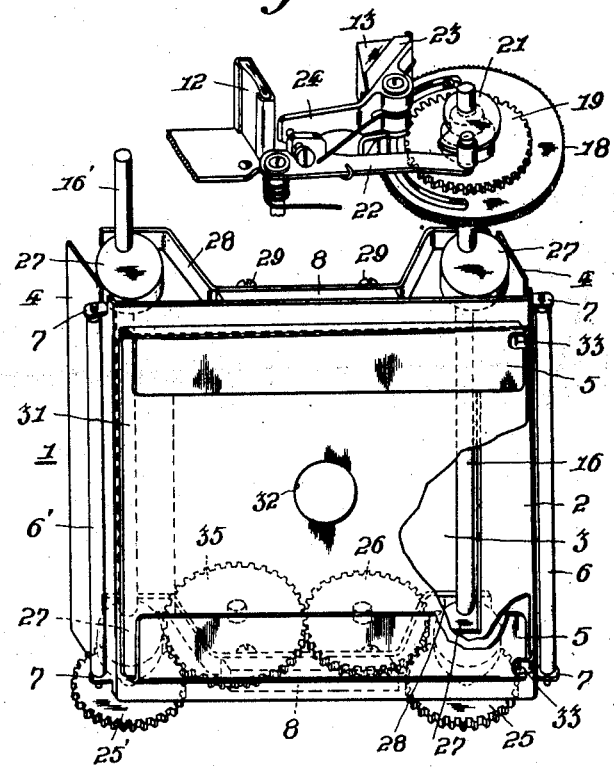
INVENTOR:
S. Mamiya
BY
Glascock Downing & Seebold
ATTORNEYS Patented Dec. 15, 1942

2,305,301

UNITED STATES PATENT OFFICE 2,305,301

FOCUSING DEVICE FOR PORTABLE PHOTOGRAPHIC CAMERAS

Seiichi Mamiya, Ohito, Takata-Gun, Japan; vested in the Alien Property Custodian Application June 5, 1940, Serial No. 339,013
In Japan July 1, 1939

1 Claim. (Cl. 95—45)

This invention relates to focusing devices for portable photographic cameras, and has for its object to provide a focusing device of simple construction that will provide an easy adjustment of the focus.

According to the invention, a film-holder receiving a film wound in a long strip on spools is mounted movably forward and backward in the case of the camera, and the adjustment of the focus is effected by moving the film-holder from or toward the lens on the operation of a range-finder provided in the camera, and consequently the construction is considerably simple and durable in comparison with the kind of focusing devices heretofore in use in which the focusing is effected by the adjustment of the lens.

A practical embodiment of the invention will now be described more particularly with reference to the accompanying drawings in which Fig. 1 is a plan view partly broken away of a camera equipped with the improved focusing device.

Fig. 3 is a longitudinal sectional view of the camera and

Fig. 4 is a detailed perspective view of the principal parts constituting the invention removed from the case of the camera.

Figure 1:
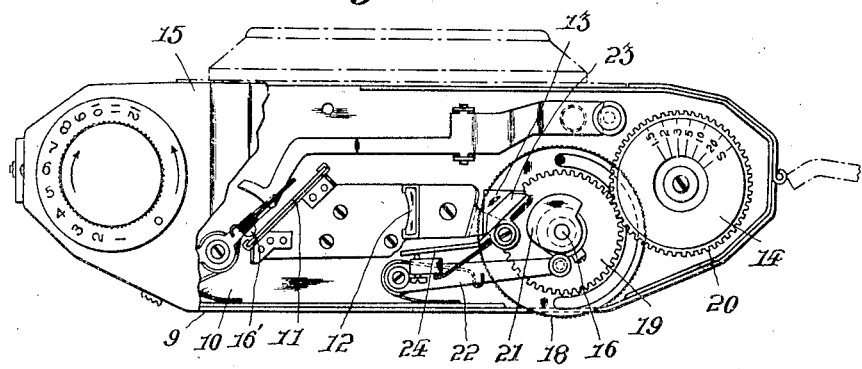

Referring now to the drawings, 1 represents the film-holder which consists of a thin plate 2 having an opening 3 and bent substantially at right angle at the ends, as indicated at 4, 4, guide plates 5, 5 attached on the plate 2 near the upper and lower ends by suitable means, such as soldering, rollers 6, 6' movably mounted on two pairs of tongues 7 struck out from the bent portion 4 of the plate 2, and bars 8, 8 attached on the foreside of the plate at the upper and lower ends by suitable means, such as soldering, for receiving securing screws, as will be described later (Fig. 4).

The range-finder is arranged on the top 10 of the case 9 of the camera. 11 represents a semi-transparent and semi-reflecting glass, 12 lens, 13 movable prism, 14 dial plate for reading the range in co-operation with an index (not shown) provided on a housing 15 on the top of the case. As the range-finder is well known and itself forms no part of the invention, the details of the range-finder are not further described.

16 represents a spindle which is rotatably mounted in the case 9 extending through the top 10 and bottom 17 of the case. On the upper end of the spindle, are secured a wheel 18 with knurled peripheral edge and partly extending out of the housing 15 for operating the spindle 16, a toothed wheel 19 for operating the dial plate 14 in co-operation with a toothed wheel 20 secured on the spindle of the dial plate, and a cam 21 for swinging the prism 13 through means of a pivoted lever 22 engaging with an extension arm 24 of the pivoted support 23 of the prism. On the lower end of the spindle is secured a toothed wheel 25 for the purpose as will be described later.

Figure 2:
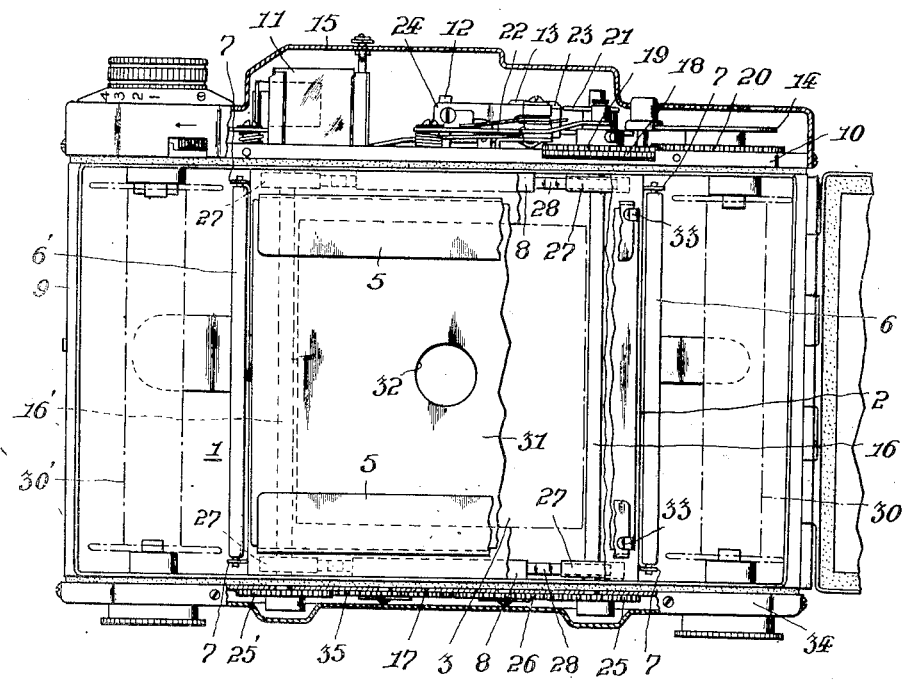
Fig. 2 is a rear elevation of the camera partly in section with the back of the camera swung to open position to expose the interior thereof.

16' represents another spindle similar to the spindle 16 and similarly mounted in a position opposite the spindle 16, except the upper end being rotatably mounted in the top of the case instead of extending out through the top. On the lower end of the spindle is secured a toothed wheel 25' similar to the toothed wheel 25, which is operatively connected to the toothed wheel 25 through means of toothed wheels 26 and 35 which are rotatably mounted on the bottom 17 of case and covered by a housing 34 (Fig. 2), so that the spindle 16' can be rotated in synchronism with the spindle 16, when the spindle 16 is operated by means of the wheel 18.

On each of the spindles 16 and 16' is eccentrically secured in the same manner a pair of the same circular cams 27, these cams being disposed in the case in the positions corresponding to the bars 8, 8 attached on the foreside of the plate 2 of the film-holder 1, when the film-holder is mounted in position in the case, as just will be described.

The film-holder 1 is slidably mounted in the case 9, and is held in position by means of the circular cams 27 and clasping strip members 28, 28 secured on the bars 8, 8 attached on the foreside of the plate 1 of the film-holder by suitable means, such as screws 29 (Fig. 4).

A film wound on a long strip on spool 30 on the right hand is led to the left hand spool 30', over the right hand roller 6, passing through between the plate 2 and the guide plates 5, and over the left hand roller 6'. As the part of the film passing through between the plate 2 and the guide plates 5 will tend to curve backwardly due to the rolled habit, a backing plate 31 with a hole 32 is preferably inserted between the back of the film and the guide plates 5, which is provided at one end with tongues 32, 32 struck out from the plate and turned up to engage with the ends of the guide plates 5, so that the plate is prevented from moving when the film is drawing from the right hand spool 30 to the left hand spool 30'.

With the above mentioned construction, when the range-finder is operated to measure the distance of an object by rotating the wheel 18 and hence the spindle 16 having the circular cams 27 secured thereon, the spindle 16' having the circular cams 27 secured thereon is simultaneously rotated through means of the train of the toothed wheels 25, 26, 35, 25', whereby the film-holder 1 is moved forward or backward to bring the surface of the film to be photographed into a focus. Thus, it is apparent that when the distance of the object is read on the dial plate, the surface of the film is brought into the focus.

I claim:

In a camera, a range finder including a rotatable member, a camera body supporting said range finder, a film-guiding frame mounted for adjustment in said body to focus the film passing therethrough in dependence upon the adjustment of said range finder, parallel shafts mounted in said body, cams carried by the opposite ends of the shafts, members on said frame engaging said cams, said rotatable member being mounted directly upon one of the shafts, and a gear train connecting one shaft with the other.

SEIICHI MAMIYA.